Figure 1:
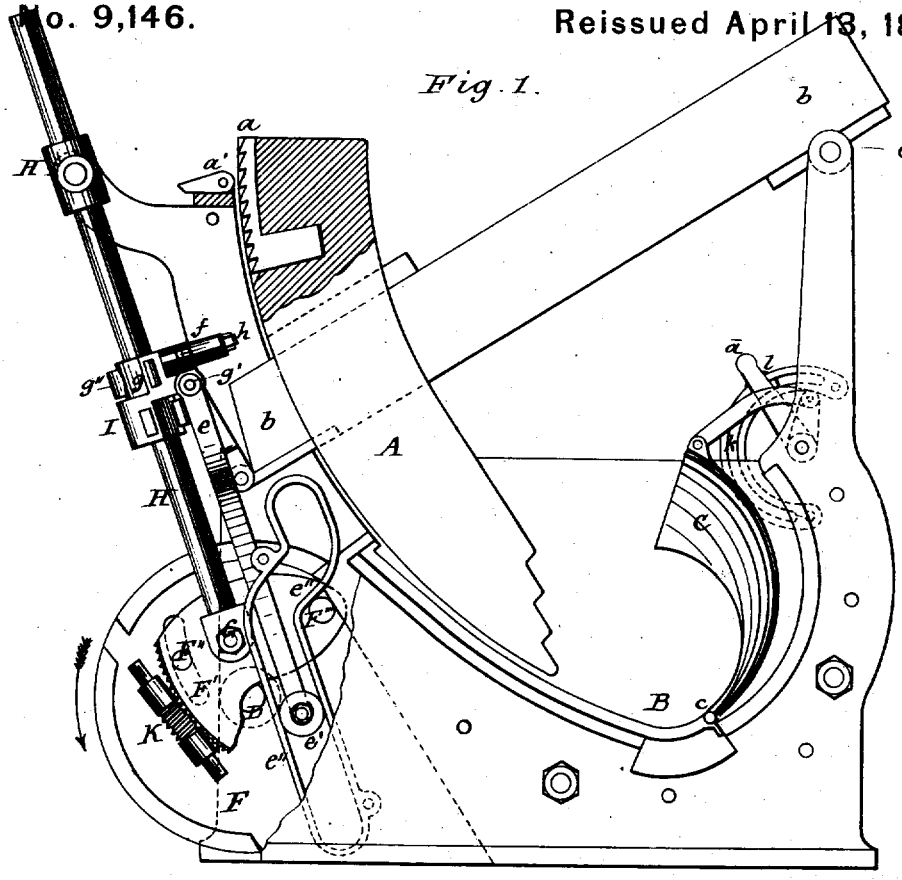

R. EICKEMEYER,

Assignor to EICKEMEYER FELTING CO.

Fulling-Mill.

No. 9,146. Reissued April 13, 1880.

Witnesses:
Philip F. Larner
Howell Bartle

Inventor:
Rudolf Eickemeyer
By Jno. C. Wood
Attorney.

N. PETERS, PHOTO-LITHOGRAPHER, WASHINGTON, D. C.

R. EICKEMEYER,

Assignor to EICKEMEYER FELTING CO.

Fulling-Mill.

No. 9,146. Reissued April 13, 1880.

Witnesses:
Philip T. Larner.
Howell Bartle.

Inventor:
Rudolf Eickemeyer.
By Munn & Co.
Attorneys.

N. PETERS, PHOTO-LITHOGRAPHER, WASHINGTON, D. C.

R. EICKEMEYER,

Assignor to EICKEMEYER FELTING CO.

Fulling-Mill.

No. 9,146. Reissued April 13, 1880.

Witnesses:
Philip F. Larner.
Howell Battle

Inventor:
Rudolf Eickemeyer.
By Wm. Ward
Attorney.

N. PETERS, PHOTO-LITHOGRAPHER, WASHINGTON, D. C.

UNITED STATES PATENT OFFICE.

RUDOLF EICKEMEYER, OF YONKERS, NEW YORK, ASSIGNOR TO EICKEMEYER FELTING COMPANY.

FULLING-MILL.

SPECIFICATION forming part of Reissued Letters Patent No. 9,146, dated April 13, 1880.

Original No. 173,922, dated February 22, 1876. Application for reissue filed March 6, 1880.

*To all whom it may concern:*

Be it known that I, RUDOLF EICKEMEYER, of Yonkers, in the county of Westchester and State of New York, have invented certain new and useful Improvements in Fulling-Mills; and I do hereby declare that the following specification, taken in connection with the drawings furnished and forming a part of the same, is a clear, true, and complete description of a fulling-mill containing the several features of my invention.

The objects sought by me through my improvements may be stated as follows: A continuous changing of position of the fabrics undergoing the fulling operation with relation to the face of the beater and the interior surfaces of the fulling-bed; a regulated speed on the part of said fabrics while changing position in the fulling-bed, so that they will meet the force of the blow from the beater with varied resistance; to operate at each blow of the beater upon all the fabrics contained in the bed, instead of operating alternately upon one-half of the fabrics, as with the well-known two-stock mill; to regulate the height from which the beater will be permitted to fall, in order that it may be readily adjusted for operation on tough or tender fabrics, or graduated for properly operating through the several initial, intermediate, and terminal stages of the fulling operation; and also to regulate the speed of the driver, so that it may be made to correspond proportionately to the height from which the beater is dropped.

For accomplishing these several objects my invention consists in certain novel features in construction and in certain novel combinations of mechanism, which are specified in detail at the close of this specification.

The several features of my said invention may be combined in one fulling-mill, or either or any number of said features less than the whole may be employed to the exclusion of the remainder, with desirable and valuable results.

In the operation of all fulling-mills heretofore known to me the fabrics in the fulling-bed are subjected to the alternate action of two beaters arranged side by side.

This mode of operation is not particularly objectionable when ordinary textile fabrics are being fulled, although one-half of the mass of fabric in the bed is acted upon separately by each beater. When, however, such mills are relied upon for fulling more tender fabrics—like felted goods, for instance—this mode of operation is objectionable, because at the earlier stages of the operation the fabrics are soft and tender, and such of them as lie on the beaten surface of the body of fabrics and are not wholly within the space occupied by the face of the beater are liable to be unduly drawn or forced out of shape, even if not torn asunder.

The interior front surface of the fulling-bed in beater-mills as heretofore constructed is curved in one direction only, forming a rectangular corner with the sides of the mill. These square corners offer a greater resistance to the upward movement of the fabrics from the bottom of the bed than the smooth central surface of the curved bed, and therefore those portions of the mass of fabrics which lie adjacent to said corners move less rapidly than those in the center, necessitating frequent removals of the fabrics from the bed for the purpose of readjustment therein.

To avoid these practical difficulties I employ a single beater, (having a breadth of face corresponding with the width of the bed,) in combination with a fulling-bed which has a front interior surface curved in two directions—that is to say, it is not only curved vertically, as heretofore, but it is also curved laterally—whereby no liability exists either for any of the articles being drawn out of shape, or for a portion of them to drag at the corners, as in the ordinary bed, and the articles are continually changed in their positions with relation to each other, to the curved surface of the bed, and to the face of the beater.

The beater in my improved mill is lifted in a different manner from any heretofore known to me. So far as my knowledge extends the lifting of beaters in fulling-mills has heretofore been effected either by means of a revolving shaft with tappets which engage with projecting ends of the beater-helves, or by segmental friction-pulleys operating on a belt or strap attached to the beaters, as described in Letters Patent originally issued to me November 25, 1873, reissued March 30, 1875. By both of these methods the speed of the initial and terminal movements of the beater corresponds with the speed of the intermediate movement.

By reason of my improvement in this connection the speed of the movement of my beater is slow at the commencement of the lift, is rapidly increased, and is then gradually diminished up to the moment at which it is dropped. This is accomplished by a peculiar manner in which a lifting-rod is operated through a crank, and is made to engage at its lowest point with the beater, and after elevating it to its full height is freely released therefrom. The lifting of the beater commences immediately after the crank-pin passes its lowest position, and it therefore moves slowly, increasing its speed as the crank revolves, until, as it approaches its highest position, the upward speed is gradually diminished until the beater is dropped. By these means I gain a smooth and easy lifting motion, practically free from sudden shocks and jars, and it is impossible to avoid those wearing and destructive influences upon the belts and operating mechanism of fulling-mills as heretofore constructed.

To vary the height from which the beater is to drop I have made the crank-pin adjustable on the face of the crank-plate, so that it may be located at any desirable point between the crank-shaft and the periphery of the crank-wheel or plate, and to regulate the resistance of the goods to the beater I have hinged the adjustable portion of the apron of the fulling-bed to the bottom of the mill and connected its upper end with an adjustable crank-arm. This latter feature, in connection with an apron curved in one direction, is found in my prior Letters Patent before herein referred to.

As in my prior patent, I have provided for this single beater a pawl, which is hinged in suitable bearings on the frame of the mill, and is arranged to engage with a toothed rack on the beater for holding it in an elevated position when it is desirable to charge the mill or remove the fabrics therefrom.

To vary the speed of the driver so as to have it correspond with the extent of movement with which the beater may be operated, I employ on the driving-shaft a cone-pulley of several grades, with either of which the belt may be made to engage, as occasion may require, a pulley properly matched therewith being mounted on the shaft from which power is immediately derived.

To more particularly describe my invention, I will refer to the drawings, which illustrate a fulling-mill embodying the several features of my invention in the best form at present known to me.

Figure 3:
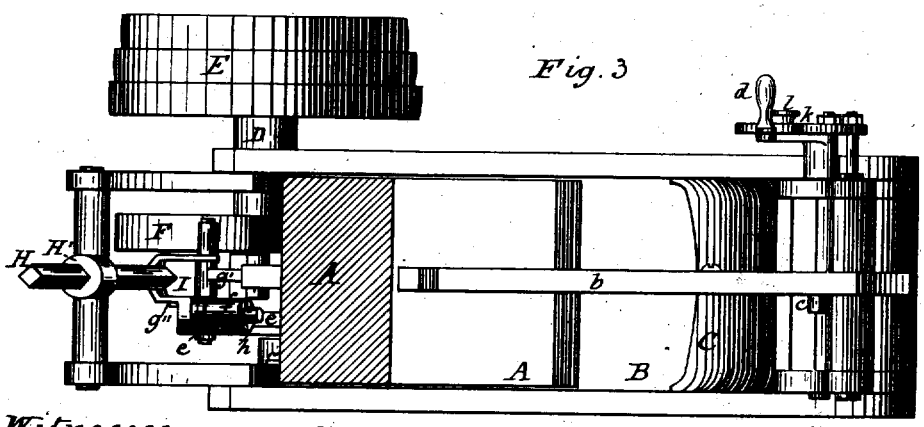
Figure 2:
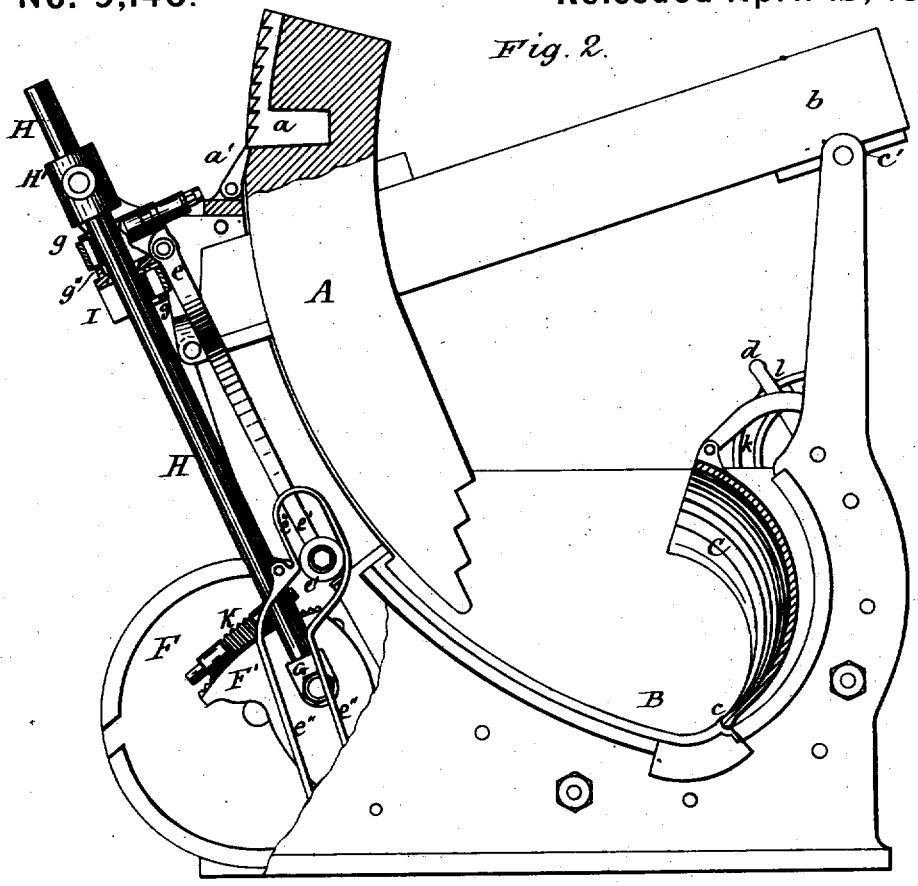
Figure 8:
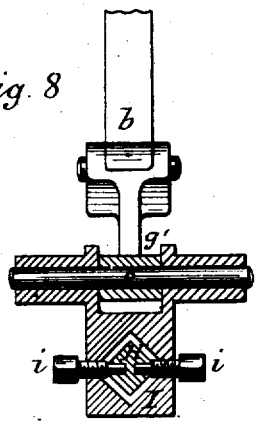
Figure 9:
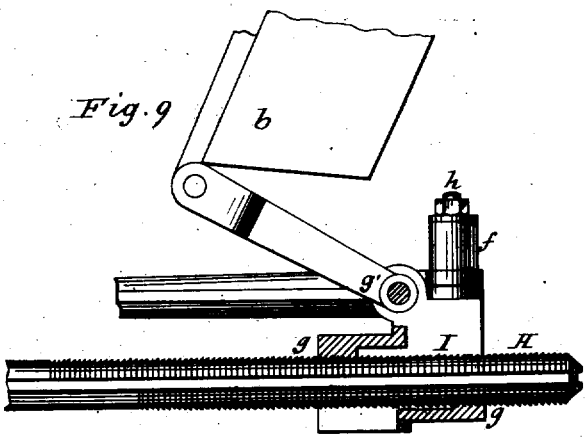
Figure 4:
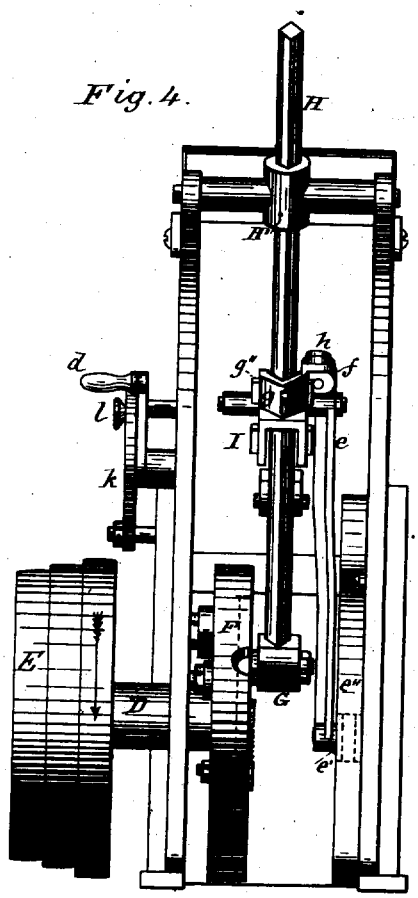
Figure 5:
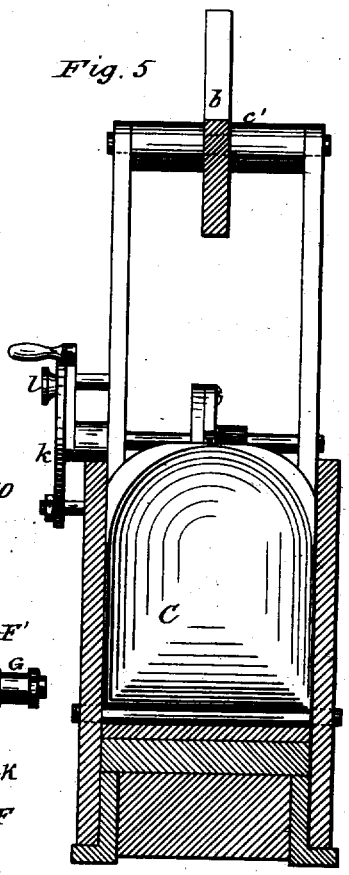
Figure 10:
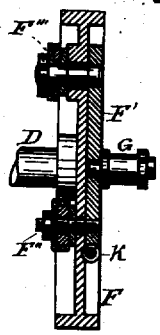
Figure 6:
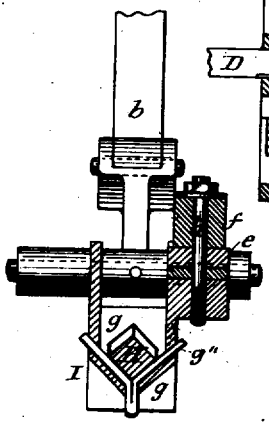
Figure 11:
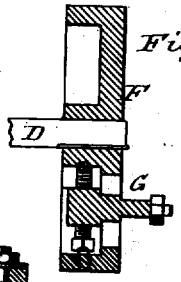
Figure 7:
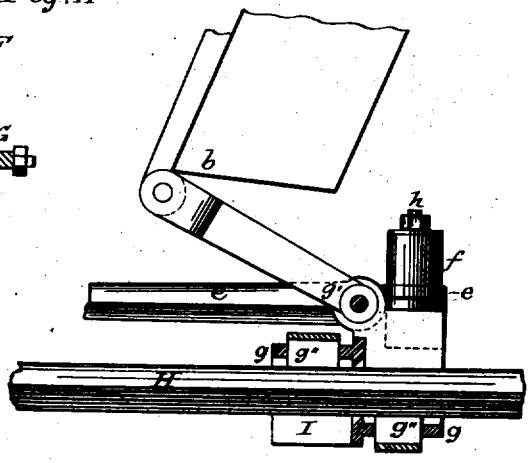

The three sheets of drawings, respectively numbered, contain as follows: Figures 1 and 2 on Sheets 1 and 2 respectively represent side views of said fulling-mill with portions thereof removed. Fig. 3, Sheet 1, represents the same in top view with a portion of the beater removed. Fig. 4, Sheet 3, represents an end view. Fig. 5, Sheet 3, represents a lateral vertical section of the same, showing the interior of the fulling-bed at the apron. Figs. 6 and 7, Sheet 3, represent in detail, on a larger scale, portions of the mechanism whereby the beaters are lifted and dropped. Figs. 8 and 9, Sheet 2, represent modifications of mechanism for performing a like service. Fig. 10, Sheet 3, represents the crank-wheel and plate in lateral section. Fig. 11 represents, in section, a crank-wheel with adjustable crank-pin, before referred to herein.

The fulling-mill shown has but one beater or fulling-stock, as at A, provided with a helve, *b*, hinged at *c'* to standards, as heretofore. B denotes the fulling-bed, which, with two side walls, constitutes the receptacle for the fabrics to be fulled. The beater is held in an elevated position when at rest by means of the segmental rack *a* in the beater and the pawl *a'* on the top of the frame, as shown in Fig. 2.

The front end or apron of the fulling-bed is shown at C, Figs. 1, 2, 3, and 5. The curved contact-surface of the apron from top to bottom and from side to side is clearly illustrated.

It will be seen that the vertical side lines of the bed merge with the surface-lines of the apron, and that no abrupt corners or edges exist with which the fabrics can possibly engage while being lifted in mass and changed in position by the action of the beater. This apron is hinged at *c* to the bottom of the metal-lined bed, so as to present a smooth continuous surface at the joint. The hinge *c* occupies a straight line extending across the fulling-bed, and the apron C is curved gradually upward from that line, and each edge or corner is gradually concaved more and more until at the apex it forms an arch, as shown in Fig. 5. This gradual change in the shape of the bed and apron from a straight line to a circular arch causes the fabrics to be continually changing their position with relation to each other, to the contact-surfaces of the bed, and to the face of the beater while passing from the bottom of the bed upward to the under side of the arch, from which they fall to the bottom of the bed, to be again exposed to the blow of the beater.

At its upper end the hinged apron is connected by links to a shaft provided with a crank, as at *d*, which is provided with a segmental stop-plate, *k*, and set-screw *l*, whereby it may be set at any desired point and locate the apron in an advanced or retired position, according to the degree of resistance which the mass of fabrics should offer to the stroke of the beater.

In mills as heretofore constructed, without the lateral curves and the arched top, and with beds curved upward only, the articles move in a solid body, without change of position with relation to each other, until, having arrived at the top, they fall forward to the bottom of the bed.

It will be seen that this feature of my invention has value in mills which do not require the adjustable or hinged bed or apron, and I do not therefore limit this portion of my invention to the hinged bed, or to a fulling-mill having but one beater.

The fulling-stock or beater A is raised and permitted to fall by means of mechanism which I will now describe in detail. D denotes the driving-shaft, located near the bottom of the frame at its rear end, and mounted in suitable boxes. On this shaft is the cone-driving pulley E, arranged to be driven in the direction indicated by the arrow thereon. (Shown in Fig. 4.) The crank-wheel F is keyed to the driving-shaft at one end, with its outer face parallel with the plane in which the beater moves. Mounted on its outer face is a segmental crank-plate, F′, pivoted to the wheel at one end by a bolt, as at F‴, and provided at its opposite or curved end with gear-teeth, which engage with a worm-shaft, K, provided with squared ends, to receive a key or wrench. The crank-wheel has a lateral curved slot, in which a bolt, as at F″, projecting from the plate F′, is fitted. The crank-wheel, segmental plate F′, and bolts F″ and F‴ are shown in Fig. 10 in detail.

In order to prevent the slipping of the plate on the wheel while in operation, I have constructed the bolts with suitable clamping-nuts, and have placed between them and the rear side of the crank-wheel recessed and flat metal washers, with a cushion of rubber between them, so that such wear as may occur at the coincident surfaces of plate and wheel may be taken up, at the same time affording a means whereby sufficient pressure may be applied to the plate for holding it in its proper position while the mill is in motion without interfering with its easy adjustment for regulating the lift of the beater. This segmental plate carries the crank-pin, as at G, to which the lower end of the lifting-rod H is attached. By turning the worm-shaft K the crank-pin may be located at any desired position between the periphery of the crank-wheel and the driving-shaft, and so regulate the height to which the beater may be elevated preparatory to its fall.

The upper end of the lifting-rod H is provided with an oscillating guide, H′, which is mounted on trunnions supported by brackets projecting rearward from the frame at its top.

The crank-pin may be rendered adjustable with relation to the axis of the crank-wheel in various ways, and differing from that before shown and described, without affecting the desirable results in connection with this feature of my invention—as, for instance, the crank-wheel may have a radial slot, as illustrated in Fig. 11. Therein the lifting-rod and crank-pin are designated by letters corresponding with those hereinbefore employed. The crank-pin in this case, which occupies the radial slot, is so constructed that it is capable of being moved to or from the axis of the crank-wheel by means of a screw, which is housed in a tapped hole in the rear end of the crank-pin, and set-screws will preferably be employed in a manner well known, wherewith the crank-pin, after radial adjustment, may be rigidly secured in any desired position. This feature, however, in combination with the single beater and the bed with the double curved surface, constitutes a valuable improvement.

The lifting-rod has an intermittent control over the beater by means of a clamp, which is linked to the helve of the beater at $g'$, and operates as a clamp from the moment the lifting-rod commences its upper movement until the crank-pin passes its most elevated position, at which time it ceases to operate.

One form of clamp is shown at I in several of the figures, and also in detail in Figs. 6 and 7, while another form is shown in Figs. 8 and 9. This clamp, as shown in Figs. 6 and 7, is to be provided with two V-shaped interior friction-surfaces at $g$, located on opposite sides and one above the other, so that when the foot of the lifting-rod is carried by the crank-wheel toward the beater both V-shaped friction-surfaces at $g$, clad, as at $g''$, with leather, rubber, or other suitable material, are made to engage with the opposite corners and sides of the rod, and, acting therewith, raise the beater.

For giving the clamp sufficient power to maintain the weight of the beater I have devised the clamp-lever $e$ and the spring $f$, so that they co-operate with the clamp and secure to it the requisite gripe or hold on the lifting-rod. The clamp-lever $e$, at its lower end, is provided with a friction-roller, $e'$, which occupies a guide, $e''$, having sides which are parallel with the line which is occupied by the center of the crank or driving shaft and the center of the oscillating guide H′. The upper end of the clamp-lever $e$ is pivoted on a stud which projects rearward from the clamp, as at $h$. The end of the stud is provided with a nut, which bears upon and compresses a rubber spring at $f$, mounted on said stud and arranged to bear against the clamp-lever $e$. When the lifting-rod is at its lowest position the clamp has no hold upon it, because the clamp-lever and rod are parallel; but as the lower end of the rod is carried inward toward the beater the upper end of the clamp-lever is also carried inward, which tilts the clamp on the hinged connection with the link that connects the beater with the clamp, causing the friction-surfaces, which are located one above and one below the axis of the hinged connection and on opposite sides of the lifting-rod, to firmly engage therewith, and thereby to lift the beater.

When the lifting-rod approaches its highest position the clamp-lever $e$ and the rod again become parallel with each other, and therefore the clamp releases its hold on the rod and the beater falls.

As the crank-wheel continues its movement, carrying the lifting-rod downward, the clamp is wholly freed therefrom, because from its position its contact-surfaces are respectively moved away from the rod.

It will be seen that the clamp will engage with the rod at any height so long as the foot of the clamp-lever is within the straight portion of its guide; but that as soon as it is raised, so that the roller fairly occupies the curved portion of the guide, the clamp has no power to engage with the rod. When the pawl *a'* is thrown forward during the operation of the mill it will first catch and hold the beater at the height to which it may be raised by the next movement of the lifting-rod, and at the next revolution of the crank-shaft it will be carried still higher, and there held for the convenient removal of fabrics from the bed. So, also, in operation, if the beater be held at any time by the goods at any given point above the lowest point, it will be lifted from that height by the rod to a point proportionately as high therefrom as would be the case if the beater were lifted from its lowest position.

In Figs. 8 and 9 the lifting-rod, instead of being smooth, as previously shown, has its opposite edges transversely serrated. It has also two longitudinal grooves, which are loosely occupied by screw-pins in the clamp, as shown in Fig. 8 at *i*. This clamp, instead of having frictional surfaces, is provided with serrated surfaces inversely corresponding with the serrated surfaces on the lifting-rod, and therefore it positively engages with the rod instead of frictionally engaging therewith. The serrated surfaces are of special value in connection with beaters of more than usual bulk or weight.

For practical operation the crank-pin is brought quite near to the center of the crank-shaft, the hinged apron is thrown back, the fabrics put into the bed, and the mill put in motion at its highest speed. As the fulling operation progresses the height of the lift is at intervals increased by moving the crank-pin outward, and the apron is gradually moved toward the beater. The apron is thus kept in a position with relation to the beater which corresponds with the gradually-changing condition of the fabrics as the fulling operation progresses.

As before stated, the fulling-bed curved in two directions is of value without the hinged feature, and is equally well adapted to mills with more than one beater; and it is equally true that the griping and lifting mechanism described is also useful in mills having more than one beater, and also that in many cases it is not necessary to combine with such mechanism the feature whereby the height of the lift may be varied. I therefore do not limit certain features of my invention to mills of any particular kind.

I claim as my invention and desire to secure by Letters Patent—

1. In a beater fulling-mill, a fulling-bed having front interior surfaces which are curved in two directions, substantially as described, and for the purposes specified.

2. The combination, substantially as hereinbefore set forth, of a suitable fulling-bed and a single beater having a breadth of face corresponding with the width of the fulling-bed, whereby the entire mass of fabrics contained within the bed are operated upon simultaneously, and continuously changed in position with relation to the bed by the action of the beater, without liability of such injury to the fabrics as is incident to the alternate action of two or more beaters operating within one fulling-bed.

3. The combination, substantially as hereinbefore set forth, of a jointed fulling-bed and a single beater having a breadth of face corresponding with the width of the fulling-bed.

4. The combination, with a single beater, of a fulling-bed having front interior surfaces which are curved in two directions, substantially as described, whereby the fabrics are not liable to be torn or twisted while being fulled.

5. The combination, with one or more beaters, of a jointed fulling-bed having front interior surfaces which are curved in two directions, substantially as described.

6. The combination, with a fulling-bed having its front interior surfaces curved in two directions, of one or more beaters provided with graduated lifting mechanism, substantially as described.

7. The combination, with a jointed fulling-bed having its front interior surfaces curved in two directions, of one or more beaters and graduated lifting mechanism, substantially as described.

8. The combination, substantially as hereinbefore described, of a fulling-mill beater, a lifting-rod, and friction mechanism for alternately lifting the beater and allowing it to drop, whereby the shocks and jars incident to the operation of a beater by means of belts and of tappets are obviated.

9. The combination, with a fulling-mill beater, of a reciprocating lifting-rod and an automatically-operated clamp attached to the beater, substantially as described.

10. The combination, with the beater of a fulling-mill, of a clamp, a lifting-rod, connected by means of a crank-pin to a crank-wheel, and adjusting mechanism, substantially as described, whereby the crank-pin may be set at any desired point with relation to the axis of the crank-wheel, as set forth.

RUDOLF EICKEMEYER.

Witnesses:
GEORGE NARR,
J. H. TARBELL.